Patented Apr. 10, 1951

2,548,263

UNITED STATES PATENT OFFICE 2,548,263

GELATINIZED STARCH

Tjako Friedrich Herman Hofman, Hoogezand, and Fritz Leo Paul Krizkovsky, Leiden, Netherlands, assignors to N. V. W. A. Scholten's Aardappelmeelfabrieken, Ossemarkt, Groningen, the Netherlands, a limited liability company No Drawing. Application December 29, 1947, Serial No. 794,436. In the Netherlands November 6, 1943

3 Claims. (Cl. 127—32)

It is known that the so-called cold swelling starch may be manufactured by heating a mixture of starch with a limited quantity of water to a temperature of between 100° and 180° C. while pressing the said mixture to form a thin layer by mechanical pressure, the said layer being dried at the same time or immediately afterwards; the flakes thus obtained are subsequently ground.

The proportion of water used for this purpose as a rule is between 50 and 200%, calculated on the weight of the starch, but it may also be lower, e. g. 25%. The cold swelling starches thus obtained have the property of dissolving in cold water to a paste which is chiefly used as an adhesive.

The present invention relates to a process of manufacturing food products, which consists in heating a mixture of starch with a limited proportion of water to a temperature of between 100° and 180° C. and simultaneously or immediately afterwards drying the same in the form of a layer of such thickness that the granular structure of substantially all starch granules will be destroyed by this treatment, but the resulting product will not substantially dissolve in cold water, whereupon the mass is comminuted to small pieces, e. g. flakes. When spreading out the mass to a layer a mechanical pressure may be exerted which, however, should not be so high that layers of an insufficient thickness for the present purpose are produced.

The well known drying apparatus having one or two cylinders used for the manufacture of cold swelling starch are very suitable for the process according to the invention.

The layers submitted to the treatment described are thicker than those used in the manufacturing of cold swelling starch. Owing to the thickness of the layers practically all starch granules will be gelatinized only partially, whereas in cold swelling starch all starch granules are completely gelatinized. As a consequence the properties of the product obtained are considerably different from those of a cold swelling starch. The said product has a more or less horny character and does not dissolve in cold water, while the particles when heated with water swell more or less, but do not coalesce and do not produce a more or less homogeneous paste. The swollen particles of the paste will only disapear after the addition of an alkali hydroxide.

We preferably use potato starch as a starting material but we may also use other kinds of starch, e. g. cassava or corn starch or mixtures of different starches.

Owing to the fact that the said particles or grains will not disappear when boiled with water or milk, but will merely swell, the product may be used successfully instead of tapioca flakes or rice- or wheat grits, the particles of which will behave in a similar way in the presence of hot aqueous liquids.

The invention will be explained by the following examples:

Example I 100 kilograms of potato starch are mixed with 100 liters of water. The suspension is spread on plates and heated to a temperature above the gelatinizing point. The dried film, which is of a thickness of between 1 and 2 mm., is comminuted in a suitable apparatus to small pieces, adapted to serve as a substitute for wheat and rice grits.

Example II

Potato starch is moistened with water until the moisture content amounts to 35%. The moist starch is spread out with the aid of a pressing roll on a rotating cylinder, heated to a temperature of 120°–130° in a layer having a thickness of 0.6–0.8 mm., this layer being heated and dried at the same time. The heated main cylinder makes one revolution per minute.

After drying the fleece, which in a dry state has a thickness of approximately 1-2 mm., is removed from the cylinder in the usual way by cutting or scraping and subsequently comminuted, whereby a product in the form of flakes or small grains is obtained.

This product, which does not dissolve in cold water and swells only to a limited extent, is an excellent substitute for the well-known quick-cooking flake tapioca.

We claim:

1. A dry food product, consisting of potato starch which is gelatinized by heating and simultaneous drying of a mixture of potato starch with not more than an equal weight of water to a temperature above the gelatinizing point, but not exceeding 180° C., the temperature and duration of the heating treatment being sufficient to destroy the granular structure of substantially all starch granules and cement the same together in a mass so that they are cemented together in the form of small pieces of broken film of a horny character, insoluble in cold water and swellable to a limited extent when heated with water, but retaining their general form.

2. A process of manufacturing a food product, consisting of gelatinized potato starch in the form of small pieces of a somewhat horny character, which are insoluble in cold water and when heated with water will swell to a limited extent, but retain their general form, which comprises heating and simultaneously drying a mixture of potato starch with not more than an equal weight of water to a temperature above the gelatinizing point but not exceeding 180° C. in the form of a layer which after drying has a thickness of approximately 1-2 mm., the temperature and duration of the heating treatment being sufficient to destroy the granular structure of substantially all starch granules and to cement the same together to a mass which, when heated with water, will only swell to a limited extent, and thereafter comminuting the film obtained to small pieces.

3. A process according to claim 2, in which the proportion of water is not more than 50%, calculated on the weight of the starch.

TJAKO FRIEDRICH HERMAN HOFMAN.
FRITZ LEO PAUL KRIZKOVSKY.

REFERENCES CITED

The following references are of record in the file of this patent:

UNITED STATES PATENTS

| Number | Name | Date |
| --- | --- | --- |
| 2,098,293 | Jeffries | Nov. 9, 1937 |
| 2,105,052 | Oltmans | Jan. 11, 1938 |
| 2,168,524 | Horesi | Aug. 8, 1939 |
| 2,178,235 | Lauterbach | Oct. 31, 1939 |
| 2,257,599 | Frischmuth | Sept. 30, 1941 |
| 2,314,459 | Salzburg | Mar. 23, 1943 |

OTHER REFERENCES

J. Biol. Chem., 1946 (162), pages 229–236 (also in J. T. I., June 1946, page A243).